UNITED STATES PATENT OFFICE.

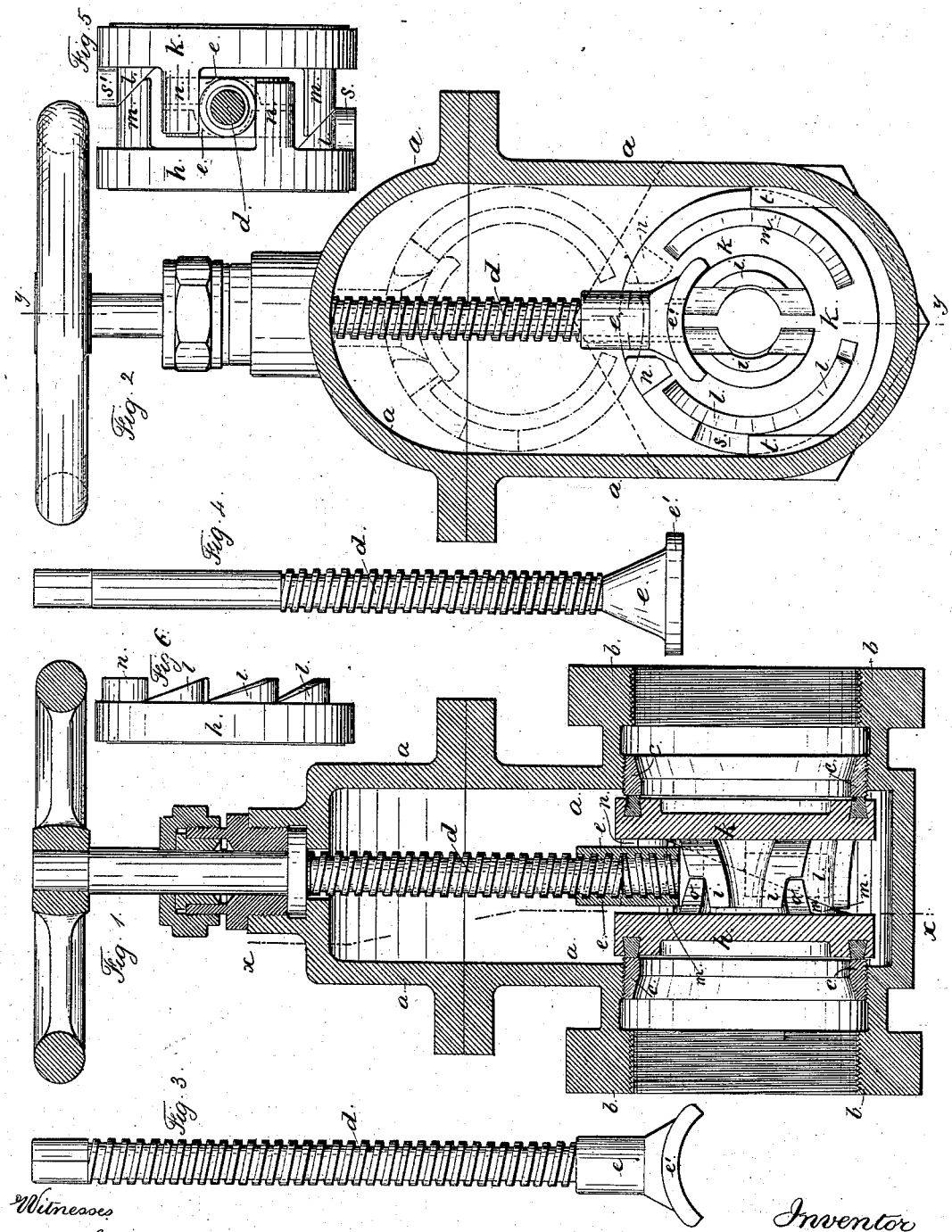

JAMES ARTHUR, OF JERSEY CITY, ASSIGNOR OF ONE-HALF TO WILLIAM S. CARR, OF PATERSON, NEW JERSEY.

STRAIGHT-WAY VALVE.

SPECIFICATION forming part of Letters Patent No. 257,634, dated May 9, 1882.

Application filed November 25, 1881. (No model.)

*To all whom it may concern:*

Be it known that I, JAMES ARTHUR, of Jersey City, in the county of Hudson and State of New Jersey, have invented an Improvement in Straight-Way Valves, of which the following is a specification.

Straight-way valves have been made with two disks with circular inclines at their backs, and either the disks or an intermediate device that has been turned slightly as the valves are pressed down to place, so that the inclines act to press the valves outwardly to their seats. These devices are complicated, liable to become obstructed by sediment, and the valves do not always draw back from their seats to relieve the friction.

I make use of two similar valve-disks, each of which is provided with interlocking cylindrical hubs and inclines, whereby the two disks are retained in their proper relative positions, but the disks can turn one against the other, and I combine with these a wedge-shaped lifter operated by the screw. This lifter when raised turns the disk-valves, so as to relieve the pressure on the valve-seats, and then lifts the valves, and when this lifter is forced down it presses the valves and causes them to partially turn after each valve rests at one side on a projection, so that the inclines on the backs of the disks force them firmly against their seats.

In the drawings, Figure 1 is a vertical section crosswise of the valves at the line $yy$, Fig. 2. Fig. 2 is a rear view of one valve-disk and section of the case at the line $xx$. Figs. 3 and 4 represent modifications of the screw for operating the lifter. Fig. 5 is a separate plan of the two disks detached, and Fig. 6 is an edge view of a disk with numerous inclines.

The valve-case $a$ and water-pipes $b$ are of ordinary construction. The seats $c$ for the valves are around the ends of the pipes $b$, inside the case. These seats may be of brass screwed to place or of ordinary cast-iron. The screw $d$ may pass through the wedge-shaped lifter $e$, hereinafter described, and be revolved to move it up or down, as shown in Figs. 1 and 2, the lifter $e$ forming a nut to the screw; or if the nut is revolved, as is the case in some straight-way valves, then the lifter may be at the lower end of the screw, as represented in Fig. 3; or the screw may be made, as seen in Fig. 4, so as to be revolved and rise and fall in a stationary nut, my improvements being available with all of these well-known styles of actuating-screws in straight-way valves.

The valves $h$ and $k$ are made as disks with flat faces, and at the back are cylindrical interlocking projections, the portion $i$ passing into the cylinder $o$, so that the valves $h$ and $k$ cannot separate laterally, but one disk can partially revolve on the other.

The inclines $l\ m$ are made as segments of cylinders, and they are similar in shape, and are at the back of each valve, and there is a lug or projection at $n$ on each disk adjacent to the wedge-shaped lifter $e$, and another lug, $s$, near the outer edge of each disk.

The backs of both disks being the same, except in the interlocking cylindrical flanges $i$ and $o$, they could be cast from one changeable pattern, and the inclines will properly rest upon each other, and can be rubbed together to smooth and finish them. Thus but little hand-work will be required. One lug $n$ of one valve will be at one side of the lifter $e$ and the other lug of the other disk will be at the other side of the lifter $e$, as seen in Fig. 6. Hence, as the lifter $e$ is raised its first action will be to force the lugs $n$ apart in consequence of its wedge shape, and in so doing the disks will be turned partially on each other and the inclines moving down each other allows the valve-disks to approach nearer together and draw away from the valve-seats, after which the projecting bases $e'$ of the lifter $e$ will lift the valve-disks bodily in opening the valve; or the valve-disks will be lowered bodily by the reverse movement of the screw, and in so doing the valve-disks will nearly reach their places before the lugs $s$ will come into contact with the stops $t$, that project inside the case $a$. When this occurs the weight of the valve-disks will tend to partially rotate such disks in opposite directions, because the disk $h$ rests on the stop $s$ at one side of the case, and the disk $k$ rests upon the stop $s'$ at the other side side of the case. This turning movement causes the inclines to run up each other, and force the faces of the valve-disks firmly to their seats. The lower part of the lifter e, acting against the circular interlocking flanges i, forces the center of the valves downwardly, insuring the perfect closing of the valve. The reverse movement of the screw relieves the pressure, turns the disks, and then lifts them, as before described.

I remark that in cases where the screw d extends across the water-way the cylindrical flanges i and o will be notched for it to pass freely through them. If the screw itself moves up and down, either in consequence of rotating the screw itself in a stationary nut, or of rotating the nut, the notches in i and o will not be needed.

If the lifter is not made wedge-shaped, it will still be operative, as the weight of the valve-disks hanging by the studs n will tend to partially rotate such disks to relieve them from pressure against the seats c.

By employing several sets of segmental inclines at the backs of the disks, as illustrated by the detached view, Fig. 6, the inclines in large valves can be as steep as those on small valves, and these inclines will take no more space between large disks than with small disks, and the necessary movement will be given to the disks in pressing them against their seats by about the same distance of movement of one periphery in relation to the other in large as in small valves.

I claim as my invention—

1. The combination, in a straight-way valve, of two disks, interlocking flanges on their backs, segmental inclines, a wedge-shaped lifter, a screw to operate the same, and the projections and stops s t, substantially as set forth.

2. In combination with the disks placed back to back in a straight-way valve, a wedge-shaped lifter introduced between the disks and mechanism for operating the same so as to give a partial rotation to the valve-disks in commencing to lift the same, substantially as set forth.

3. In a straight-way valve, two disks, each having similar segmental inclines upon the back, a projection by which it is lifted, and a projection by which its downward movement is arrested, in combination with the screw and lifter and a case having the projections t, substantially as set forth.

Signed by me this 23d day of November, A. D. 1881.

JAS. ARTHUR.

Witnesses:
GEO. T. PINCKNEY,
CHAS. H. SMITH.